United States Patent
Miki et al.

(10) Patent No.: US 8,184,955 B2
(45) Date of Patent: May 22, 2012

(54) INFORMATION RECORDING APPARATUS, INFORMATION RECORDING SYSTEM, AND INFORMATION RECORDING METHOD

(75) Inventors: Nanami Miki, Tokyo (JP); Hideaki Miyahara, Saitama (JP)

(73) Assignee: Sony Corporation (JP)

( * ) Notice: Subject to any disclaimer, the term of this patent is extended or adjusted under 35 U.S.C. 154(b) by 745 days.

(21) Appl. No.: 12/291,757

(22) Filed: Nov. 13, 2008

(65) Prior Publication Data

US 2009/0141603 A1    Jun. 4, 2009

(30) Foreign Application Priority Data

Nov. 29, 2007  (JP) ............................... P2007-309399

(51) Int. Cl.
*H04N 9/80* (2006.01)
(52) U.S. Cl. ........................................ 386/252; 386/253
(58) Field of Classification Search .................. 386/200, 386/241, 252, 253
See application file for complete search history.

(56) References Cited

U.S. PATENT DOCUMENTS 7,194,752 B1    3/2007    Kenyon et al.

FOREIGN PATENT DOCUMENTS

| EP | 0283570 A2 | 9/1988 |
|----|------------|--------|
| EP | 1249836    | 10/2002 |
| EP | 1372152    | 12/2003 |
| EP | 1890290    | 2/2008 |
| JP | 7-046517 A | 2/1995 |
| JP | 9-171660 A | 6/1997 |
| JP | 9-322174 A | 12/1997 |
| JP | 2002-109102 A | 4/2002 |
| JP | 2002-290905 A | 10/2002 |
| JP | 2002-312247 A | 10/2002 |
| JP | 2005250567 | 9/2005 |
| JP | 02005250567 A * | 9/2005 |
| JP | 2005-293731 A | 10/2005 |

OTHER PUBLICATIONS

European Search Report, EP 08170221.
Communication from EP Application No. 08170221, dated Apr. 16, 2010.

* cited by examiner

*Primary Examiner* — Huy T Nguyen
(74) *Attorney, Agent, or Firm* — Lerner, David, Littenberg, Krumholz & Mentlik, LLP

(57) ABSTRACT

Disclosed is an information recording apparatus including: a storage portion configured to store information that is copy-protected; a recording portion configured to record, on a recording medium, the information stored in the storage portion; a first information extraction portion configured to extract, from the information stored in the storage portion, first information that indicates a feature of the information; a second information extraction portion configured to extract, from the information recorded on the recording medium, second information that indicates a feature of the information; a judgment portion configured to perform a comparison as to whether the first and second information match, and judge whether the information recorded on the recording medium can be reproduced based on the comparison; and a deletion portion configured to delete the information stored in the storage portion when the judgment portion judges that the information recorded on the recording medium is capable of being reproduced.

9 Claims, 8 Drawing Sheets

|  | Feature point | Time stamp |
|---|---|---|
| Image feature point | Scene-changing time point a 1 | 01 : 20 : 00 |
|  | Scene-changing time point a 2 | 02 : 20 : 00 |
|  | Scene-changing time point a 3 | 03 : 20 : 00 |
|  | Scene-changing time point a 4 | 04 : 20 : 00 |
|  | ⋮ | ⋮ |
| Audio feature point | Exciting time point b 1 | 02 : 20 : 00 |
|  | Exciting time point b 2 | 03 : 20 : 00 |
|  | Exciting time point b 3 | 04 : 20 : 00 |
|  | Exciting time point b 4 | 08 : 00 : 25 |
|  | ⋮ | ⋮ |

FIG.5

|  | Feature point | Time stamp | Block count |
|---|---|---|---|
| Image feature point | Scene-changing time point a 1 | 01 : 20 : 00 | 1 |
|  | ⋮ | ⋮ |  |
|  | Scene-changing time point a 4 | 04 : 20 : 00 |  |
|  | Scene-changing time point a 5 | 04 : 40 : 00 | 2 |
|  | ⋮ | ⋮ |  |
|  | Scene-changing time point a 8 | 06 : 40 : 00 |  |
|  | ⋮ | ⋮ | 3 ~ N |
| Audio feature point | Exciting time point b 1 | 02 : 20 : 00 | 1 |
|  | Exciting time point b 2 | 03 : 20 : 00 |  |
|  | Exciting time point b 3 | 04 : 20 : 00 |  |
|  | Exciting time point b 4 | 08 : 00 : 25 |  |
|  | ⋮ | ⋮ | 2 ~ N |

FIG.6

|  | Feature point | Time stamp | Block count |
|---|---|---|---|
| Image feature point | Scene-changing time point a 1 | 01 : 20 : 00 | 1 |
| | Scene-changing time point a 2 | 02 : 20 : 00 | |
| | Scene-changing time point a 4 | 04 : 20 : 00 | |
| | Scene-changing time point a 5 | 04 : 40 : 00 | 2 |
| | Scene-changing time point a 7 | 05 : 40 : 00 | |
| | Scene-changing time point a 8 | 06 : 40 : 00 | |
| | ⋮ | ⋮ | 3 ~ N |
| Audio feature point | Exciting time point b 1 | 02 : 20 : 00 | 1 |
| | Exciting time point b 2 | 03 : 20 : 00 | |
| | Exciting time point b 4 | 08 : 00 : 25 | |
| | ⋮ | ⋮ | 2 ~ N |

FIG.7

INFORMATION RECORDING APPARATUS, INFORMATION RECORDING SYSTEM, AND INFORMATION RECORDING METHOD

CROSS REFERENCES TO RELATED APPLICATIONS

The present application claims priority from Japanese Patent Application No. JP 2007-309399, filed in the Japanese Patent Office on Nov. 29, 2007, the entire content of which is incorporated herein by reference.

BACKGROUND OF THE INVENTION

1. Field of the Invention

The present invention relates to an information recording apparatus, an information recording system, and an information recording method.

2. Description of the Related Art

In related art, in a case where a copy-protected content is moved between media, whether data movement is completed is judged based on criteria such as whether the contents meet a standard (ARIB standard defined by Association of Radio Industries and Businesses) that is required to be met for the movement between the media and whether a series of operations as a system are completed. When those criteria are satisfied, it is judged that the data of the content has been moved from a recording source to a recording destination (movement completion). For example, the data is recorded from the recording source to the recording destination, and then the data in the recording source is deleted, to thereby complete the data movement (see, Japanese Patent Application Laid-open No. 2002-290905, paragraph [0023]).

SUMMARY OF THE INVENTION

With the above-described technique, however, even when data of a content fails to be properly recorded on a disk due to a failure of the disk as a medium or a hardware failure, it is erroneously judged that the data movement is completed based on the above-described criteria. As a result, there arises a problem in that the data in the recording source may be deleted.

In addition, when it is judged whether the data can be reproduced after the data is recorded on the disk of a recording destination, a judgment on whether the data in the recording destination can be reproduced is required. However, an appropriate criterion is not necessarily set.

In view of the above-mentioned circumstances, it is desirable to provide an information recording apparatus, an information recording system, and an information recording method capable of reliably recording copy-protected information on a recording medium.

According to an embodiment of the present invention, there is provided an information recording apparatus. The information recording apparatus includes a storage portion, a recording portion, a first information extraction portion, a second information extraction portion, a judgment portion, and a deletion portion. The storage portion is configured to store information that is copy-protected. The recording portion is configured to record, on a recording medium, the information stored in the storage portion. The first information extraction portion is configured to extract, from the information stored in the storage portion, first information that indicates a feature of the information. The second information extraction portion is configured to extract, from the information recorded on the recording medium, second information that indicates a feature of the information. The judgment portion is configured to compare the first information and the second information as to whether the first information and the second information match each other, and judge whether the information recorded on the recording medium is capable of being reproduced based on a comparison. The deletion portion is configured to delete the information stored in the storage portion when the judgment portion judges that the information recorded on the recording medium is capable of being reproduced.

By the copy protection setting, a restriction is imposed when the data is copied from the storage portion to the recording medium, for example. In the copy protection setting, modes such as "copy free" and "copy once" are set. The "copy free" means that the data can be freely copied. The "copy once" means that the data can be copied only once.

In the embodiment of the present invention, the copy-protected information stored in the storage portion is recorded on the recording medium by the recording portion, and the first information extracted from the storage portion and the second information extracted from the recording medium are compared, with the result that the judgment portion can judge that the information recorded on the recording medium can be reproduced when the features of the first information and the second information match each other. As a result, the recording medium with no defect regarding at least the feature point can be obtained. The information stored in the storage portion is deleted by the deletion portion when the judgment portion judges that the information on the recording medium can be reproduced. Thus, the information can be reliably recorded (moved) on the recording medium.

The first information includes first audio information and first image information. The first audio information includes information at exciting time points arranged in a chronological order, and the first image information includes information at scene-changing time points arranged in a chronological order. The second information includes second audio information and second image information. The second audio information includes information on exciting time points at the exciting time points, and the second image information includes information on scene-changing time points at the scene-changing time points.

The judgment portion determines the exciting time points and the scene-changing time points based on time stamp information serving as information on time when exciting events occur or when scenes are changed.

With this structure, by judging whether the first audio information at the exciting time points stored in the storage portion and the second audio information at the exciting time points recorded on the recording medium match each other, and judging whether the first image information at the scene-changing time points stored in the storage portion and the second image information at the scene-changing time points recorded on the recording medium match each other, it can be judged whether the information recorded on the recording medium can be reproduced.

The information recording apparatus further includes a holding portion configured to hold the information stored in the storage portion without deletion, when the judgment portion judges that the information recorded on the recording medium is incapable of being reproduced.

With this structure, the information stored in the storage portion is not deleted to be held when it is judged that the information recorded on the recording medium cannot be reproduced, and the information can be moved from the storage portion to the recording medium again.

The information recording apparatus further includes a storing portion configured to store the information in the storage portion. The first information extraction portion extracts, when the storing portion is storing the information in the storage portion, the first information from the information that has already been stored in the storage portion.

With this structure, a time period required from when the information starts to be stored in the storage portion until the first information is extracted can be reduced.

The second information extraction portion extracts, when the recording portion is recording the information on the recording medium, the second information from the information that has already been recorded on the recording medium.

With this structure, a time period required from when the information starts to be recorded on the recording medium until the second information is extracted can be reduced.

The first audio information is capable of being subjected to a setting change into audio information different from that at the exciting time points, and the first image information is capable of being subjected to a setting change into image information different from that at the scene-changing time points.

With this structure, the feature extracted from the information can be changed according to the content of the information to be moved, and the information recorded on the recording medium and the information stored in the storage portion can be reliably compared.

According to another embodiment of the present invention, there is provided an information recording apparatus. The information recording apparatus includes a storage portion, a recording portion, a first information extraction portion, a second information extraction portion, a judgment portion, and a reduction portion. The storage portion is configured to store information that is copy-protected. The recording portion is configured to record, on a recording medium, the information stored in the storage portion. The first information extraction portion is configured to extract, from the information stored in the storage portion, first information that indicates a feature of the information. The second information extraction portion is configured to extract, from the information recorded on the recording medium, second information that indicates a feature of the information. The judgment portion is configured to compare the first information and the second information as to whether the first information and the second information match each other, and judge whether the information recorded on the recording medium is capable of being reproduced based on a comparison. The reduction portion is configured to reduce a count of reproductions of the information stored in the storage portion, when the judgment portion judges that the information recorded on the recording medium is capable of being reproduced.

In the embodiment of the present invention, the feature points are compared to judge whether the feature points match each other. Therefore, when it is judged that the feature points match each other, the recording medium with no defect regarding at least the feature point can be obtained. When it is judged that the information recorded on the recording medium can be reproduced, the reduction portion reduces the count of reproductions of the information stored in the storage portion, and thus the information can be reliably recorded on (moved to) the recording medium.

According to another embodiment of the present invention, there is provided an information recording system configured to record information on a recording medium from an information recording apparatus in which information that is copy-protected is stored. The information recording system includes the information recording apparatus and the recording medium. The information recording apparatus includes a storage portion configured to store the information, a recording portion configured to record, on a recording medium, the information stored in the storage portion, a first information extraction portion configured to extract, from the information stored in the storage portion, first information that indicates a feature of the information, a second information extraction portion configured to extract, from the information recorded on the recording medium, second information that indicates a feature of the information, a judgment portion configured to compare the first information and the second information as to whether the first information and the second information match each other, and judge whether the information recorded on the recording medium is capable of being reproduced based on a comparison, and a deletion portion configured to delete the information stored in the storage portion when the judgment portion judges that the information recorded on the recording medium is capable of being reproduced. On the recording medium, the second information that is recorded by the recording portion and extracted by the second information extraction portion is recorded.

In the embodiment of the present invention, the copy-protected information stored in the storage portion is recorded on the recording medium by the recording portion, and the first information extracted from the storage portion by the first information extraction portion and the second information extracted from the recording medium by the second information extraction portion are compared, so that the judgment portion can judge that the information recorded on the recording medium can be reproduced, when the features of the first information and the second information match each other. As a result, the recording medium with no defect regarding the at least the feature point can be obtained. The deletion portion deletes the information stored in the storage portion when it is judged that the information recorded on the recording medium can be reproduced, and thus the information can be reliably recorded on (moved to) the recording medium.

The first information includes first audio information and first image information. The first audio information includes information at exciting time points arranged in a chronological order, and the first image information includes information at scene-changing time points arranged in a chronological order. The second information includes second audio information and second image information. The second audio information includes information on exciting time points at the exciting time points, and the second image information includes information on scene-changing time points at the scene-changing time points.

According to another embodiment of the present invention, there is provided an information recording method. The information recording method includes: storing, in a storage portion, information that is copy-protected; recording, on a recording medium, the information stored in the storage portion; extracting, from the information stored in the storage portion, first information that indicates a feature of the information; extracting, from the information recorded on the recording medium, second information that indicates a feature of the information; comparing the first information and the second information as to whether the first information and the second information match each other, and judging whether the information recorded on the recording medium is capable of being reproduced based on a comparison; and deleting the information stored in the storage portion when it is judged that the information recorded on the recording medium is capable of being reproduced.

The first information includes first audio information and first image information. The first audio information includes information at exciting time points arranged in a chronological order, and the first image information includes information at scene-changing time points arranged in a chronological order. The second information includes second audio information and second image information. The second audio information includes information on exciting time points at the exciting time points, and the second image information includes information on scene-changing time points at the scene-changing time points.

According to another embodiment of the present invention, there is provided an information recording method. The information recording method includes: storing, in a storage portion, information that is copy-protected; recording, on a recording medium, the information stored in the storage portion; extracting, from the information stored in the storage portion, first information that indicates a feature of the information; extracting, from the information recorded on the recording medium, second information that indicates a feature of the information; comparing the first information and the second information as to whether the first information and the second information match each other, and judging whether the information recorded on the recording medium is capable of being reproduced based on a comparison; and reducing a count of reproductions of the information stored in the storage portion, when the judgment portion judges that the information recorded on the recording medium is capable of being reproduced.

As described above, according to the embodiments of the present invention, the copy-protected information can be reliably recorded on the recording medium by the information recording apparatus.

These and other objects, features and advantages of the present invention will become more apparent in light of the following detailed description of best mode embodiments thereof, as illustrated in the accompanying drawings.

BRIEF DESCRIPTION OF DRAWINGS

FIG. 5 is a diagram showing data of an image feature point and an audio feature point obtained in ST401 and ST402, respectively, of FIG. 4;

FIG. 6 is a diagram showing data of an image feature point and an audio feature point, each of which is separated into N blocks in ST403 of FIG. 4;

FIG. 7 is a diagram showing a list of data of image feature points and audio feature points obtained in the processing of the flowchart shown in FIG. 4;

DESCRIPTION OF PREFERRED EMBODIMENTS

Hereinafter, embodiments of the present invention will be described with reference to the drawings.

Figure 1:
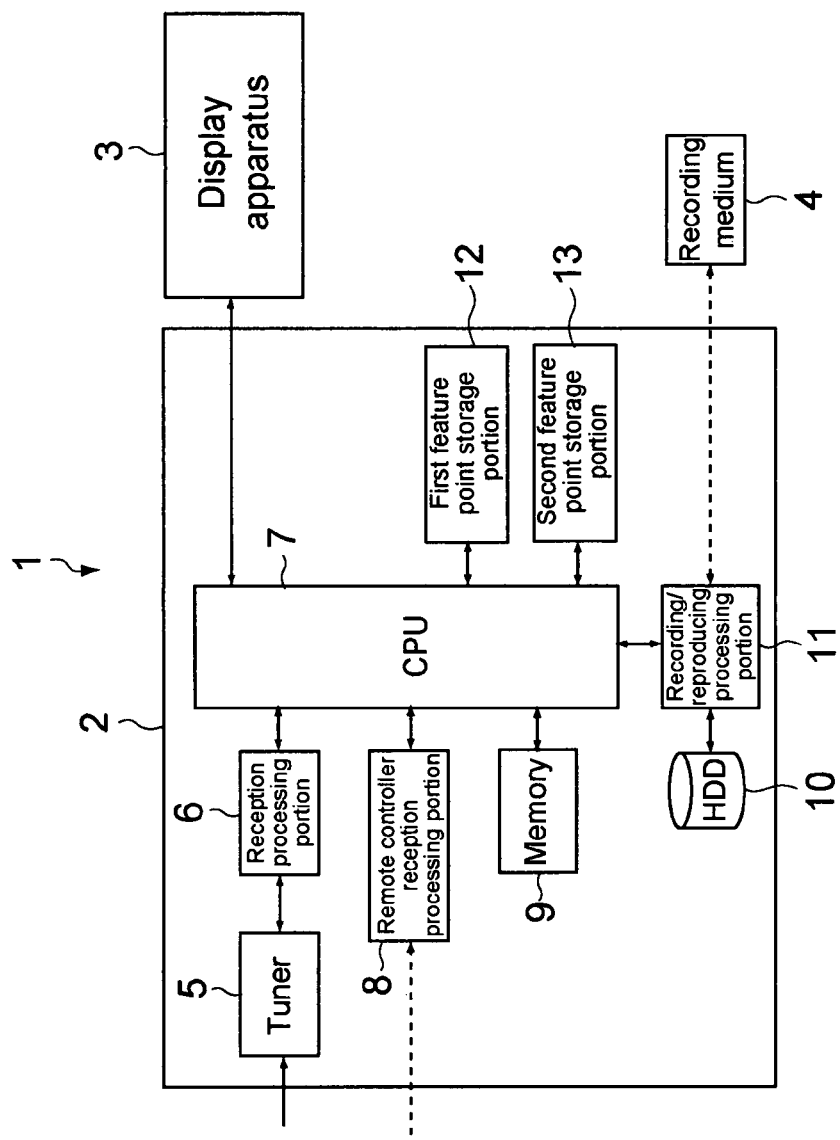
FIG. 1 is a block diagram showing an information recording system according to an embodiment of the present invention.

FIG. 1 is a block diagram showing an information recording system according to an embodiment of the present invention.

As shown in FIG. 1, an information recording system 1 includes an information recording apparatus 2, a display apparatus 3, and a recording medium 4.

The information recording apparatus 2 includes a tuner 5, a reception processing portion 6, a CPU 7, a remote controller reception processing portion 8, a memory 9, an HDD (hard disc drive) 10, a recording/reproducing processing portion 11, a first feature point storage portion 12, and a second feature point storage portion 13.

In analog broadcast reception, for example, the tuner 5 extracts a signal of a target channel and amplifies the extracted signal. Further, in digital broadcast reception, the tuner 5 performs processings such as demodulation and error correction. A signal that has been subjected to the processings by the tuner 5 is supplied to the reception processing portion 6.

In the reception processing portion 6, the signal supplied from the tuner 5 is subjected to a predetermined signal processing. For example, when broadcast waves received are terrestrial analog broadcast waves, a processing of extracting a luminance signal, a color-difference signal, or an audio signal, and a processing of extracting a synchronization signal and structuring an image based on the synchronization signal are performed. Meanwhile, when broadcast waves received are digital broadcast waves, the tuner 5 descrambles a transport stream (hereinafter, abbreviated as TS) decoded by being subjected to demodulation, error correction, deinterleaving, and the like. The descrambled TS is demultiplexed. Then, a decoding processing in which information items demultiplexed are decoded, D/A (digital to analog) conversion, and the like are performed.

A video signal generated through the processing performed by the reception processing portion 6 is supplied to the display apparatus 3 through the control by the CPU 7. In the display apparatus 3, a signal processing corresponding to the display apparatus 3 is performed on a video signal supplied from the information recording apparatus 2, and an image is displayed on the display apparatus 3. In the same way, an audio signal generated through the processing performed by the reception processing portion 6 is supplied to the display apparatus 3 and reproduced from a speaker (not shown).

The CPU 7 is implemented by a microprocessor, for example, and controls the respective portions of the information recording apparatus 2. In addition, as will be described later, for example, when a content stored in the HDD 10 is moved to the recording medium 4, a feature point is extracted from the content stored in the HDD 10 and is stored in the first feature point storage portion 12, a feature point of a content recorded on the recording medium 4 is extracted and stored in the second feature point storage portion 13 as will be described later, these feature points are compared to check whether the content recorded on the recording medium 4 can be reproduced, and control is performed according to the check result.

The remote controller reception processing portion 8 demodulates a remote control signal such as an infrared signal sent from a remote control apparatus (not shown) as an example of a mobile operation device. Through the demodulation processing, an electrical instruction signal is generated, and the generated instruction signal is supplied to the CPU 7. The CPU 7 performs control according to the instruction signal supplied from the remote controller reception processing portion 8.

The memory 9 includes a ROM (read only memory) and a rewritable RAM (random access memory). The ROM stores a program executed by the CPU 7. Further, the RAM is used as a work area when the program stored in the ROM is executed by the CPU 7, for example.

The HDD (hard disc drive) 10 stores a content received through the broadcast wave or the like.

The recording/reproducing processing portion 11 performs processings of recording/reproducing a content to/from the HDD 10 according to the kinds of the recording medium 4.

The first feature point storage portion 12 stores information on the first feature point that is a feature point (described later) indicating a feature of the content stored in the HDD 10.

The second feature point storage portion 13 stores information on the second feature point that is a feature point (described later) indicating a feature of the content stored in the recording medium 4.

The display apparatus 3 receives a display processing signal processed by the CPU 7 and displays, e.g., a moving image on a display screen.

Examples of the recording medium 4 include a magnetic tape, a rewritable optical disk, and a semiconductor memory.

Figure 2:
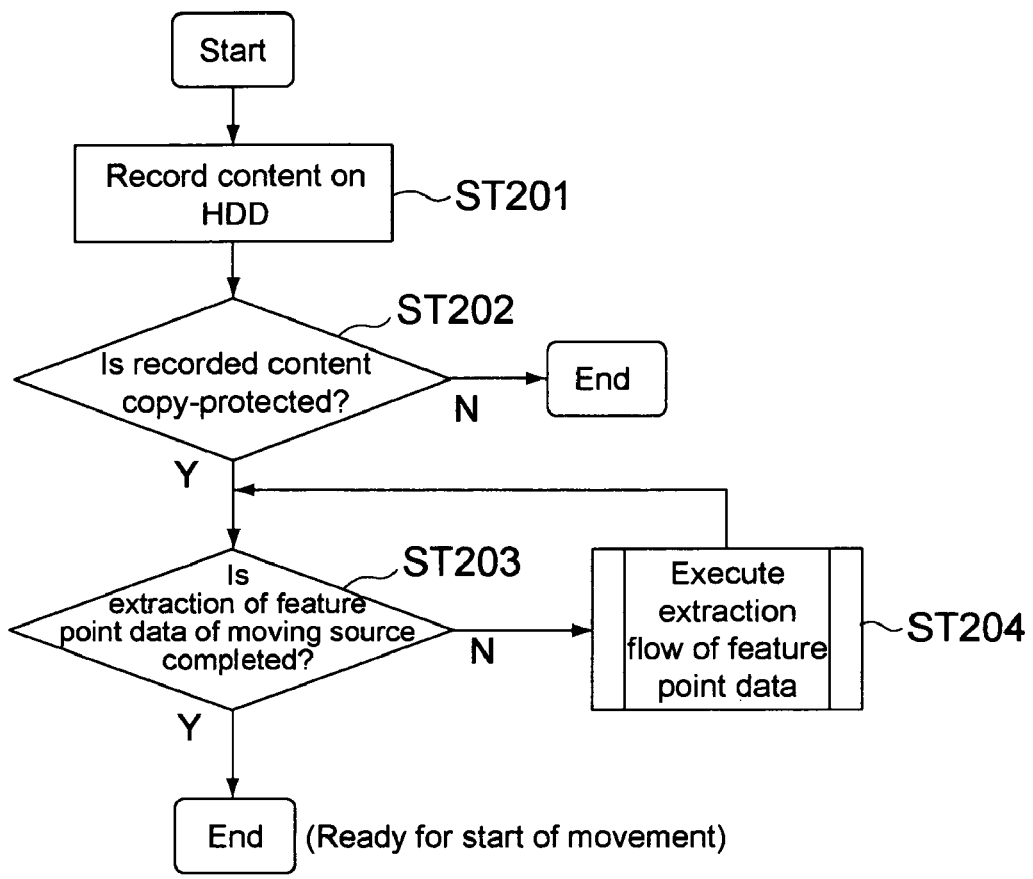
FIG. 2 is a flowchart for explaining an operation to display a movement confirmation screen for confirming whether a content recorded is to be moved to a recording medium.
Figure 3:
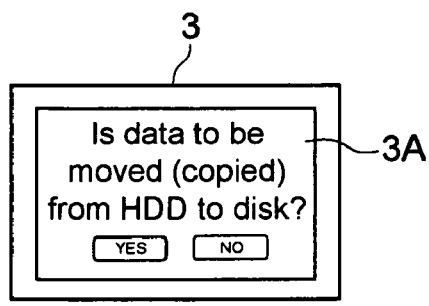
FIG. 3 is a diagram showing the movement confirmation screen displayed on the display apparatus through the processing shown in FIG. 2.

FIG. 2 is a flowchart for explaining an operation to display a movement confirmation screen for confirming whether the content recorded on the information recording apparatus 2 is to be moved to the recording medium 4. FIG. 3 is a diagram showing the movement confirmation screen displayed on the display apparatus 3 through the processing shown in FIG. 2.

The information recording apparatus 2 receives a content via an antenna (not shown) or the tuner 5 and records the content in the HDD 10 (ST201).

The information recording apparatus 2 judges whether the recorded content is given a copy protection (copy-once) setting according to, e.g., the ARIB standard (ST202). A copy protection mode of "copy free", "copy once", or the like is assigned to the content recorded by the information recording apparatus 2. The "copy free" means that the content can be freely copied or recorded. The "copy once" means that the content can be copied or recorded only once.

When the copy protection (copy once) setting is not given to the content (NO in ST202), a copy confirmation screen (not shown) is displayed on the display apparatus 3.

When the copy protection (copy once) setting is given to the content (YES in ST202), it is judged whether extraction of the feature point of the content stored in the HDD 10 as a recording source has been completed (ST203).

When the extraction of the feature point of the content stored in the HDD 10 has not been completed (NO in ST203), a processing of extracting information of a feature point (described later) of the content as the first information is executed, and data of the feature point of the content is stored in the first feature point recording portion 12 (ST204).

When the extraction of the data of the feature point of the content stored in the HDD 10 has been completed (YES in ST203), a movement confirmation screen 3A shown in FIG. 3 is displayed on the display apparatus 3, and the processing is ended.

Figure 4:
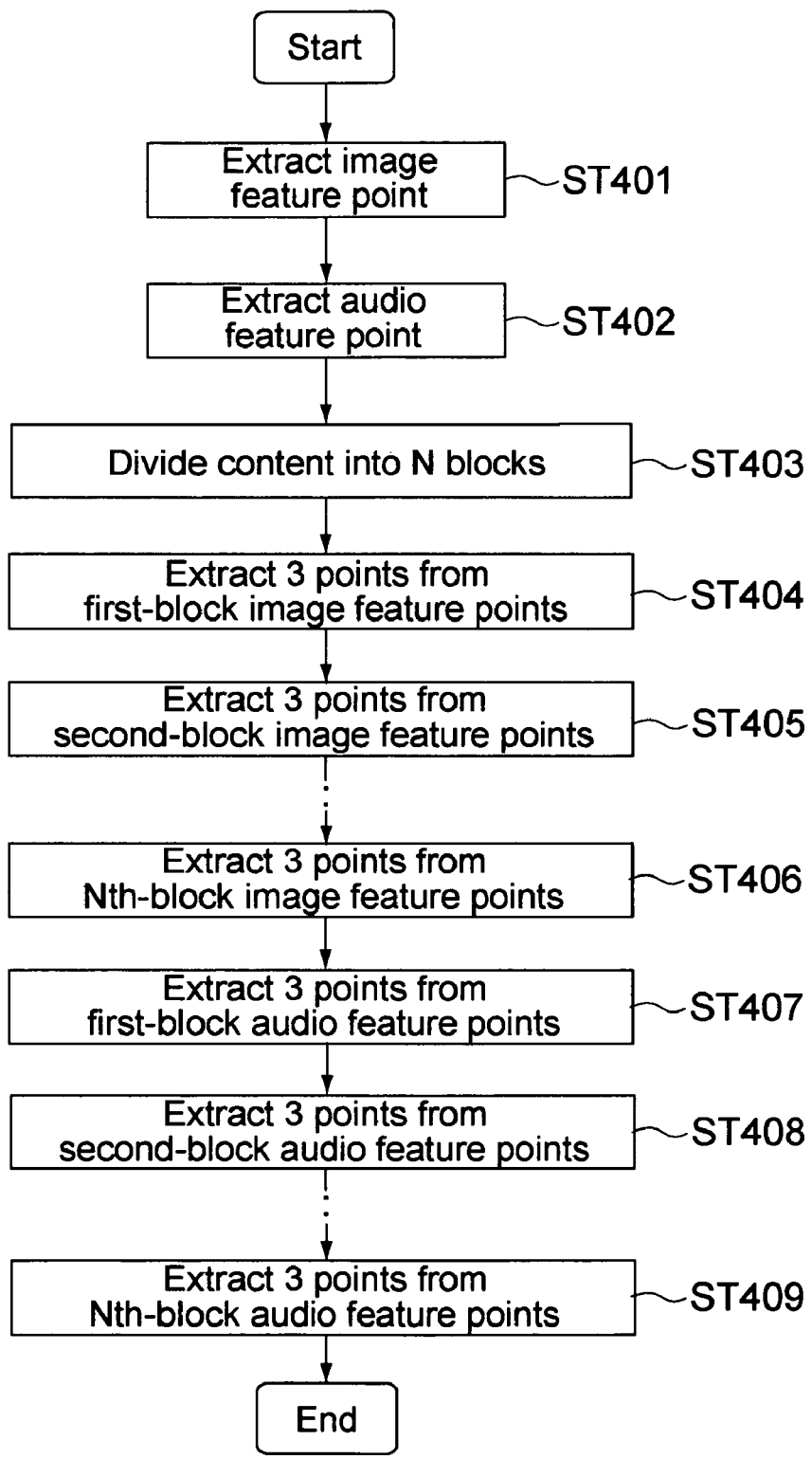
FIG. 4 is a flowchart for explaining an operation of a processing of extracting feature point data of contents, which is executed in ST204 of FIG. 2.

FIG. 4 is a flowchart for explaining an operation of a processing of extracting the data of the feature point of the contents, which is executed in ST204 of FIG. 2. FIG. 5 is a diagram showing data of an image feature point and an audio feature point obtained in ST401 and ST402, respectively, of FIG. 4. FIG. 6 is a diagram showing data of an image feature point and an audio feature point, each of which is separated into N blocks in ST403 of FIG. 4. FIG. 7 is a diagram showing a list of data of image feature points and audio feature points obtained in the processing of the flowchart shown in FIG. 4.

As shown in FIG. 4, the information recording apparatus 2 extracts, from image information of the content stored in the HDD 10, an image feature point that indicates a feature of the image information (ST401).

As shown in FIG. 5, the image feature point includes attribute information such as a "feature point" and a "time stamp". FIG. 5 shows that a scene-changing time point a1 corresponds to "01:20:00", a scene-changing time point a2 corresponds to "02:20:00", a scene-changing time point a3 corresponds to "03:20:00", and a scene-changing time point a4 corresponds to "04:20:00".

The information recording apparatus 2 judges whether the scene of the content has changed based on whether a differential value of areas in a color histogram (described later) between continuous frames in the image information exceeds a predetermined threshold value, for example. When the information recording apparatus 2 judges that the scene has changed, the "scene-changing time point a1" as the feature point information is stored in the first feature point storage portion 12 along with the time stamp information of "01:20:00" at that time. When the differential value does not exceed the predetermined threshold value, the information recording apparatus 2 judges that the scene-changing time point is not present between the two continuous frames, and does not store the time point.

The color histogram is a graph showing how pixels in an image of a frame are distributed in each tone. In the graph, an abscissa axis indicates tones of luminance, and an ordinate axis indicates frequencies thereof (the number of pixels). The differential value of the areas in the color histogram corresponds to a value of an area obtained as a difference when overlapping color histograms for continuous frames.

The information recording apparatus 2 extracts, from audio information of the content stored in the HDD 10, an audio feature point that indicates a feature of the audio information (ST402).

As shown in FIG. 5, the audio feature point includes attribute information such as a "feature point" and a "time stamp". FIG. 5 shows that an exciting time point b1 corresponds to "02:20:00", an exciting time point b2 corresponds to "03:20:00", an exciting time point b3 corresponds to "04:20:00", and an exciting time point b4 corresponds to "08:00:25".

The information recording apparatus 2 judges whether the content has reached an exciting time point based on whether there is a sudden change in audio output value of the audio information of the content, for example. When the information recording apparatus 2 judges that the content has reached the exciting time point, the "exciting time point b1" as the feature point information is stored in the first feature point storage portion 12 along with the time stamp information of "02:20:00" at that time.

For example, when the audio output value equal to or more than a predetermined threshold value is detected for a predetermined time period or more, it is judged that the audio output value has suddenly changed.

The image feature point and the audio feature point shown in FIG. 5 that are extracted in ST401 and ST402, respectively, are each divided into N blocks as shown in FIG. 6 (ST403). Specifically, as shown in FIG. 6, the scene-changing time points a1 to a4 are grouped as a first block, and the scene-changing time points a5 to a8 are grouped as a second block, for example. Meanwhile, the exciting time points b1 to b4 are grouped as a first block, for example.

From the scene-changing time points a1 to a4 in the first block shown in FIG. 6, three scene-changing time points a1, a2, and a4 are extracted at random as shown in FIG. 7, for example (ST404).

In the same way, from the scene-changing time points a5 to a8 in the second block shown in FIG. 6, three scene-changing time points a5, a7, and a8 are extracted at random as shown in FIG. 7, for example (ST405). Similarly, with respect to each of third to N-th blocks, three scene-changing time points are repeatedly extracted (ST406, etc.). It should be noted that the number of the scene-changing time points to be extracted from each block is not limited.

From the exciting time points b1 to b4 in the first block shown in FIG. 6, three exciting time points b1, b2, and b4 are extracted at random as shown in FIG. 7, for example (ST407).

In the same way, from exciting time points in the second block, e.g., three exciting time points are extracted at random (ST408). Similarly, with respect to each of third to N-th blocks, three exciting time points are repeatedly extracted (ST409, etc.). It should be noted that the number of the exciting time points to be extracted from each block is not limited.

As described above, the image feature points and the audio feature points shown in FIG. 7 are extracted from the content stored in the HDD 10 over an entire time range of the content information, and are stored in the first feature point storage portion 12.

Figure 8:
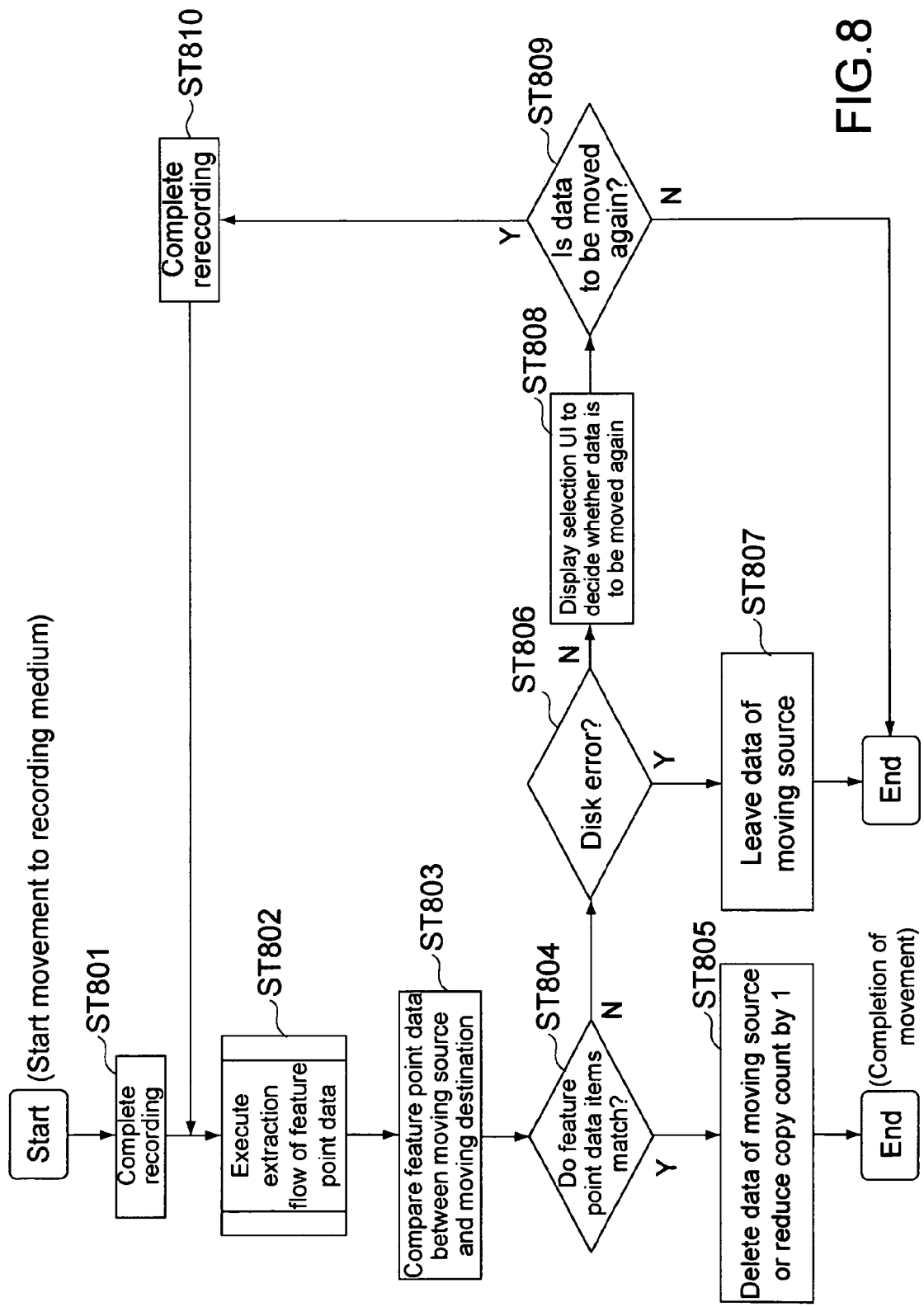
FIG. 8 is a flowchart for explaining an operation of a processing of moving (or copying) a content recorded.

FIG. 8 is a flowchart for explaining an operation of a processing of moving (or copying) a content recorded in the HDD 10. FIGS. 9A to 9D are diagrams showing display screens corresponding to steps of FIG. 8.

Figure 9A:
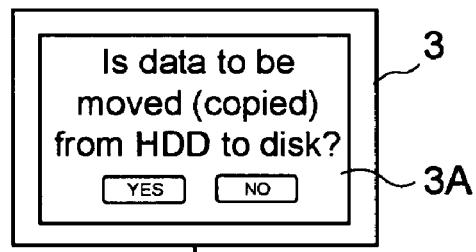
FIGS. 9A to 9D are diagrams showing display screens corresponding to steps of FIG. 8.
Figure 9B:
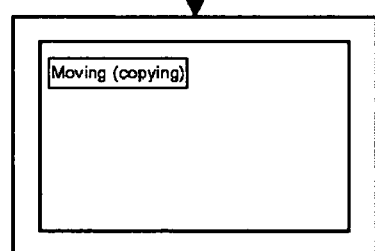

When "YES" (which means that a content is moved (copied) from an HDD to a disk) is selected in the movement confirmation screen 3A shown in FIG. 9A (which is the same as that of FIG. 3), "moving (copying)" is displayed on the display screen as shown in FIG. 9B, and a content stored in the HDD 10 is recorded on the recording medium 4 (ST801).

The information recording apparatus 2 performs the processing of extracting the feature point data shown in FIG. 4, to extract the feature point data as shown in FIG. 7 as the second information from the content information recorded on the recording medium 4 (ST802).

The data (of the moving source) of the feature point of the content shown in FIG. 7 that has been extracted from the HDD 10 in ST204 and the data (of the moving destination) of the feature point of the content that has been extracted from the recording medium 4 in ST802 are compared (ST803), and it is judged whether these data items of the feature points match each other (ST804).

Figure 9C:
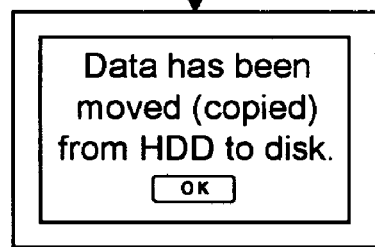

When the data of the moving source and the data of the moving destination match each other (YES in ST804), the content stored in the HDD 10 serving as the moving source is deleted (ST805), completion of the movement (copy) is indicated as shown in FIG. 9C, and the processing is ended. It should be noted that, in a case where the number of times the copy can be performed is set according to the copy protection setting, the copy count is reduced and a remaining copy count is displayed, to end the processing.

When the data of the moving source and the data of the moving destination do not match each other (NO in ST804), it is checked whether the recording medium 4 is inserted into a DVD drive (not shown) of the information recording apparatus 2 (disk error) (ST806).

When the recording medium 4 is not inserted (YES in ST806), the data of the content of the moving source is left without deletion (ST807), and the processing is ended.

Figure 9D:
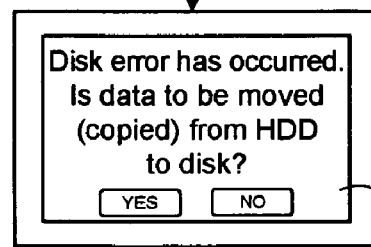

When the recording medium 4 is inserted (NO in ST 806), a selection display screen 3B that indicates an occurrence of a disk error and prompts a decision on whether to perform the movement (copy) again is displayed on the display apparatus 3 as shown in FIG. 9D (ST808).

The information recording apparatus 2 judges whether the content is to be moved again based on an input signal from a user on the selection display screen 3B shown in FIG. 9D (ST809).

When the user selects "YES" on the selection display screen 3B shown in FIG. 9D (YES in ST809), the information recording apparatus 2 records again, on the recording medium 4, the information of the content that remains stored in the HDD 10 (ST810), and the process returns to ST802 to execute the subsequent processings.

When the user selects "NO" on the selection display screen 3B shown in FIG. 9D (NO in ST809), the information recording apparatus 2 ends the processing without performing the movement (copy) processing.

As described above, according to this embodiment, the information of the content that is stored in the HDD 10 of the information recording apparatus 2 and that has been subjected to the copy-protection setting is recorded on the recording medium 4 by the recording/reproducing processing portion 11 (ST801), the information on the image feature point and the audio feature point shown in FIG. 7 extracted from the content stored in the HDD 10 and the information on the image feature point and the audio feature point extracted from the content recorded on the recording medium 4 are compared (ST 803), and the information recorded on the recording medium 4 is judged to be capable of being reproduced when the respective features match each other (YES in ST804). For example, the scene-changing time point a1 as the image feature point and the exciting time point b1 as the audio feature point are compared. Therefore, the recording medium 4 from which the information can be reproduced without a defect regarding at least the scene-changing time point a1, the exciting time point b1, and the like can be obtained. When it is judged that the information recorded on the recording medium 4 can be reproduced (YES in ST804), the information of the content stored in the HDD 10 is deleted (ST805). Thus, the information can be reliably recorded on (moved to) the recording medium 4.

Even when the movement fails due to a failure of the information recording apparatus 2 or the recording medium 4 (NO in ST804), the information recording apparatus 2 leaves the data of the moving source without deletion (ST807), or allows the data to be moved again (ST808). As a result, by moving the data again (ST810), the content during movement can be reliably moved.

When the content has not been subjected to the copy-protection setting (NO in ST202), that is, when the setting of the copy protection is in a copy-free mode, the processings from ST801 to ST804 of FIG. 8 are executed. When the feature points match each other (YES in ST804), the copy is judged to be completed, and thus the processing shown in FIG. 8 may be ended without executing ST805.

With the above-described structure, even in the case of the copy-free mode, the contents whose feature points match each other can be reliably copied.

Figure 10:
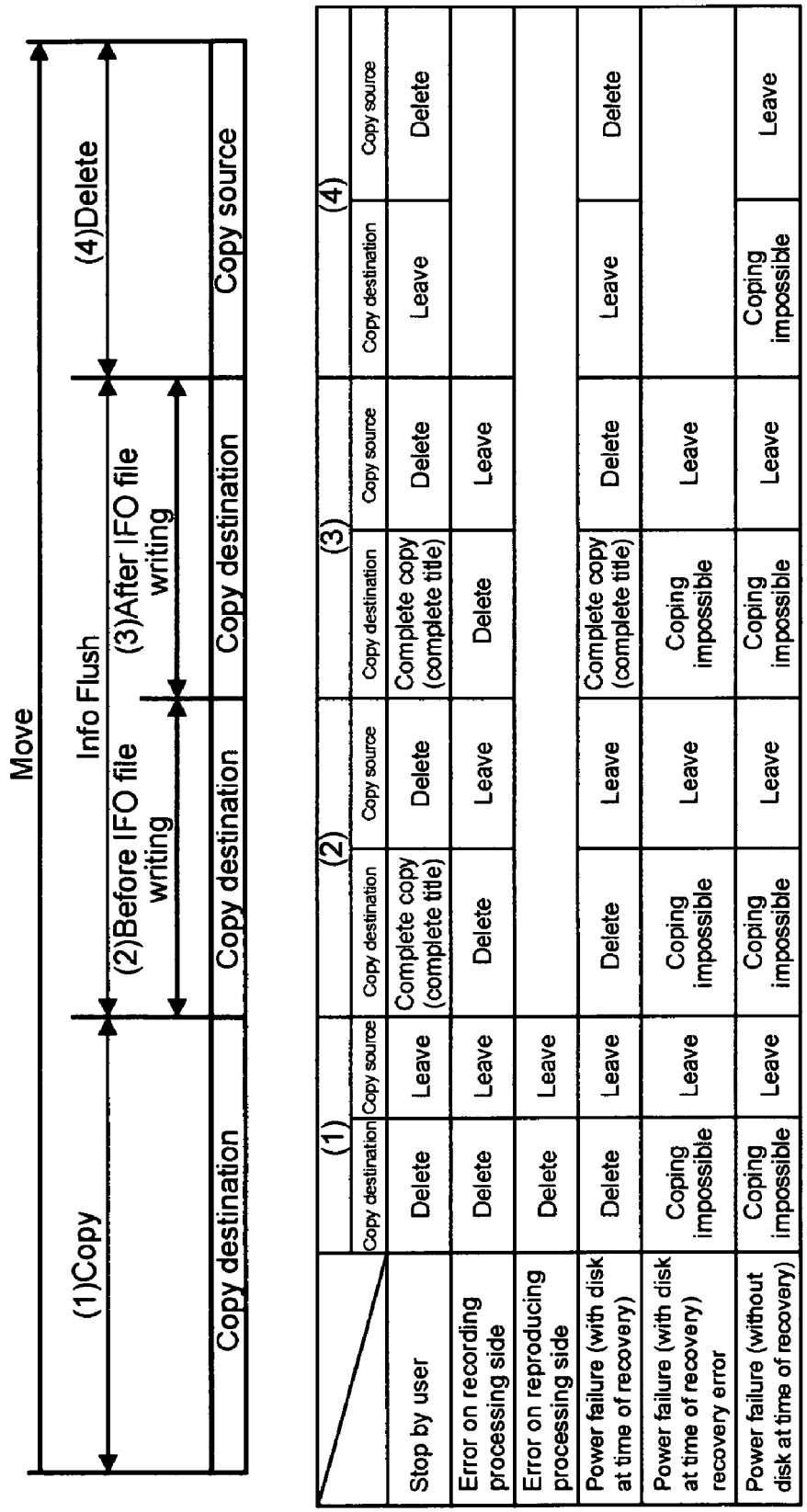
FIG. 10 is a diagram showing a list of control in cases of various errors during movement of the content.

FIG. 10 is a diagram showing a list of control in cases of various errors during movement of the content.

In FIG. 10, kinds of the errors are described in a row direction, and divided periods during the movement (copy) of the content are described in a column direction.

As shown in FIG. 10, examples of the errors include stop of the information recording apparatus 2 by the user, an error on a recording processing side, an error on a reproducing processing side, a power failure (with an optical disk at the time of recovery), a power failure (with an optical disk at the time of recovery) recovery error, and a power failure (without an optical disk at the time of recovery).

Examples of the periods during the movement (copy) of the content include a period (1) from when the movement (copy) is started until the audio information and the image information are recorded on the recording medium 4, a period (2) before an information file (including information such as a title, a menu, and a caption) is recorded on the recording medium 4 after the period (1), a period (3) before the data of the moving source starts to be deleted after the information file is recorded on the recording medium 4, and a period (4) during which the data of the moving source is deleted.

As shown in FIG. 10, for example, when the "stop of the information recording apparatus 2 by the user" (in the first row) occurs, the data of the recording destination is deleted and the data of the recording source is left in the period (1), the recording onto the recording destination is completed (a title is completed) and the data in the recording source is deleted in the periods (2) and (3), and the data of the recording destination is left and the data of the recording source is deleted in the period (4).

When the "error on the recording processing side" (in the second row) occurs, the data of the recording destination is deleted and the data of the recording source is left in the periods (1), (2), and (3).

When the "error on the reproducing processing side" (in the third row) occurs, the data of the recording destination is deleted and the data of the recording source is left in the period (1).

When the "power failure (with an optical disk at the time of recovery)" (in the fourth row) occurs, the data of the recording destination is deleted and the data of the recording source is left in the periods (1) and (2), the recording onto the recording destination is completed (a title is completed) and the data of the recording source is deleted in the period (3), and the data of the recording destination is left and the information of the recording source is deleted in the period (4).

When the "power failure (with an optical disk at the time of recovery) recovery error" (in the fifth row) occurs, nothing can be done with respect to the recording destination and the information of the recording source is left in the periods (1), (2), and (3).

When the "power failure (without an optical disk at the time of recovery)" (in the sixth row) occurs, (that is, when a disk error occurs), nothing can be done with respect to the recording destination but the data of the recording source can be left without deletion in the periods (1), (2), (3), and (4). In this way, according to this embodiment, the data of the recording source can be left and can be moved later again in the case of the lowermost row of FIG. 10.

It should be noted that the present invention is not limited to the above embodiment and can be variously changed within the scope of the technical idea of the present invention.

In the above embodiment, as shown in FIG. 2, the content is recorded on the HDD 10 (ST201) and then the feature point of the recorded content is extracted (ST204). However, it is desirable to extract the image feature point and the audio feature point that can be extracted from the image information and the audio information that have been already stored in the HDD 10 while the recording/reproducing processing portion 11 of the information recording apparatus 2 is storing the information of the content in the HDD 10 (during the recording of the content), for example.

With this structure, a time period required from when the content starts to be recorded on the HDD 10 until the image feature point and the audio feature point shown in FIG. 7 are extracted can be reduced.

In the above embodiment, as shown in FIG. 8, the content in the HDD 10 is recorded on the recording medium 4 (ST801) and then the feature point of the content recorded on the recording medium 4 is extracted (ST802). However, for example, it is desirable to extract the image feature point and the audio feature point that can be extracted from the image information and the audio information that have been already recorded on the recording medium 4 while the recording/reproducing processing portion 11 of the information recording apparatus 2 is recording the information of the content on the recording medium 4 (during the movement).

With this structure, a time period required from when the information starts to be recorded on the recording medium 4 until the image feature point and the audio feature point are extracted can be reduced.

In the above embodiment, the content is moved (copied) from the HDD 10 of the information recording apparatus 2 to the recording medium 4. However, the content may be moved (copied) to another recording apparatus compatible with a digital living network alliance (DLNA with W/DTCP) connected to the information recording apparatus 2 via an interface (IEEE1394) (not shown).

In the above embodiment, the scene-changing time point a1 and the like are cited as examples of the image feature point and the exciting time point b1 and the like are cited as examples of the audio feature point. However, the image feature point may be subjected to a system setting change to information different from the scene-changing time point a1 and the like, while the audio feature point may be subjected to a system setting change to information different from the exciting time point b1 and the like.

Specifically, as the audio feature point, a specific frequency generation time point at which sound of a specific frequency pattern is generated may be adopted, for example. Also, as the image feature point, a title display time point at which a title whose luminance is larger than that of other time points is displayed may be adopted, for example.

What is claimed is:

1. An information recording apparatus, comprising:
a storage portion configured to store information that is copy-protected;
a recording portion configured to record, on a recording medium, the information stored in the storage portion;
a first information extraction portion configured to extract, from the information stored in the storage portion, first information that indicates a feature of the information;
a second information extraction portion configured to extract, from the information recorded on the recording medium, second information that indicates a feature of the information;
a judgment portion configured to compare the first information and the second information as to whether the first information and the second information match each other, and judge whether the information recorded on the recording medium is capable of being reproduced based on a comparison; and a deletion portion configured to delete the information stored in the storage portion when the judgment portion judges that the information recorded on the recording medium is capable of being reproduced, wherein the first information includes first audio information and first image information, the first audio information including information on exciting time points arranged in a chronological order, the first image information including information on scene-changing time points arranged in a chronological order, and wherein the second information includes second audio information and second image information, the second audio information including information on exciting time points at the exciting time points, the second image information including information on scene-changing time points at the scene-changing time points.

2. The information recording apparatus according to claim 1, further comprising
a holding portion configured to hold the information stored in the storage portion without deletion, when the judgment portion judges that the information recorded on the recording medium is incapable of being reproduced.

3. The information recording apparatus according to claim 1, further comprising
a storing portion configured to store the information in the storage portion,
wherein the first information extraction portion extracts, when the storing portion is storing the information in the storage portion, the first information from the information that has already been stored in the storage portion.

4. The information recording apparatus according to claim 3,
wherein the second information extraction portion extracts, when the recording portion is recording the information on the recording medium, the second information from the information that has already been recorded on the recording medium.

5. The information recording apparatus according to claim 1,
wherein the first audio information is capable of being subjected to a setting change into audio information different from that at the exciting time points, and
wherein the first image information is capable of being subjected to a setting change into image information different from that at the scene-changing time points.

6. An information recording apparatus, comprising:
a storage portion configured to store information that is copy-protected;
a recording portion configured to record, on a recording medium, the information stored in the storage portion;
a first information extraction portion configured to extract, from the information, stored in the storage portion, first information that indicates a feature of the information;
a second information extraction portion configured to extract, from the information recorded on the recording medium, second information that indicates a feature of the information;
a judgment portion configured to compare the first information and the second information as to whether the first information and the second information match each other, and judge whether the information recorded on the recording medium is capable of being reproduced based on a comparison; and a reduction portion configured to reduce a count of reproductions of the information stored in the storage portion, when the judgment portion judges that the information recorded on the recording medium is capable of being reproduced, wherein the first information includes first audio information and first image information, the first audio information including information on exciting time points arranged in a chronological order, the first image information including information on scene-changing time points arranged in a chronological order, and wherein the second information includes second audio information and second image information, the second audio information including information on exciting time points at the exciting time points, the second image information including information on scene-changing time points at the scene-changing time points.

7. An information recording system configured to record information on a recording medium from an information recording apparatus in which information that is copy-protected is stored, comprising:
the information recording apparatus including a storage portion configured to store the information, a recording portion configured to record, on a recording medium, the information stored in the storage portion, a first information extraction portion configured to extract, from the information stored in the storage portion, first information that indicates a feature of the information, a second information extraction portion configured to extract, from the information recorded on the recording medium, second information that indicates a feature of the information, a judgment portion configured to compare the first information and the second information as to whether the first information and the second information match each other, and judge whether the information recorded on the recording medium is capable of being reproduced based on a comparison, and a deletion portion configured to delete the information stored in the storage portion when the judgment portion judges that the information recorded on the recording medium is capable of being reproduced; and
the recording medium on which the second information that is recorded by the recording portion and extracted by the second information extraction portion is recorded,
wherein the first information includes first audio information and first image information, the first audio information including information on exciting time points arranged in a chronological order, the first image information including information on scene-changing time points arranged in a chronological order, and
wherein the second information includes second audio information and second image information, the second audio information including information on exciting time points at the exciting time points, the second image information including information on scene-changing time points at the scene-changing time points.

8. An information recording method for use by an information recording apparatus, comprising:
storing, in a storage portion, information that is copy-protected;
recording, on a recording medium, the information stored in the storage portion;
extracting, from the information stored in the storage portion, first information that indicates a feature of the information;

extracting, from the information recorded on the recording medium, second information that indicates a feature of the information;

comparing the first information and the second information as to whether the first information and the second information match each other, and judging whether the information recorded on the recording medium is capable of being reproduced based on a comparison; and deleting the information stored in the storage portion when it is judged that the information recorded on the recording medium is capable of being reproduced, wherein the first information includes first audio information and first image information, the first audio information including information on exciting time points arranged in a chronological order, the first image information including information on scene-changing time points arranged in a chronological order, and wherein the second information includes second audio information and second image information, the second audio information including information on exciting time points at the exciting time points, the second image information including information on scene-changing time points at the scene-changing time points.

9. An information recording method for use by an information recording apparatus, comprising:

storing, in a storage portion, information that is copy-protected;

recording, on a recording medium, the information stored in the storage portion;

extracting, from the information stored in the storage portion, first information that indicates a feature of the information;

extracting, from the information recorded on the recording medium, second information that indicates a feature of the information;

comparing the first information and the second information as to whether the first information and the second information match each other, and judging whether the information recorded on the recording medium is capable of being reproduced based on a comparison; and reducing a count of reproductions of the information stored in the storage portion, when it is judged that the information recorded on the recording medium is capable of being reproduced, wherein the first information includes first audio information and first image information, the first audio information including information on exciting time points arranged in a chronological order, the first image information including information on scene-changing time points arranged in a chronological order, and wherein the second information includes second audio information and second image information, the second audio information including information on exciting time points at the exciting time points, the second image information including information on scene-changing time points at the scene-changing time points.

* * * * *